United States Patent [19]

Nomura et al.

[11] 4,281,096

[45] Jul. 28, 1981

[54] MANUFACTURING PROCESS FOR POLYURETHANE AUTO PARTS AND AUTO PARTS MANUFACTURED THEREBY

[75] Inventors: Takao Nomura, Toyota; Yoshiro Umemoto, Nagoya; Shuichiro Takao, Toyota, all of Japan

[73] Assignee: Toyota Jidosha Kogyo Kabushiki Kaisha, Toyota, Japan

[21] Appl. No.: 103,398

[22] Filed: Dec. 13, 1979

[30] Foreign Application Priority Data

Jun. 29, 1979 [JP] Japan .................................. 54-82509

[51] Int. Cl.$^3$ ..................... C08G 18/18; C08J 9/04; B29F 1/00; B29D 27/00
[52] U.S. Cl. ..................... 528/53; 260/45.75 N; 260/45.9 QB; 264/45.3; 264/328.2; 264/328.18; 264/DIG. 83; 521/129; 521/172; 521/174; 528/76; 528/80
[58] Field of Search .............. 264/DIG. 83, 54, 328.2, 264/328.18, 45.3; 260/45.75 N, 45.9 QB; 521/129, 172, 174; 528/53, 76, 80

[56] References Cited

U.S. PATENT DOCUMENTS

| | | |
|---|---|---|
| 2,129,135 | 9/1938 | Jones .................... 260/45.9 QB X |
| 2,905,654 | 9/1959 | Ambelang ................. 260/45.9 QB |
| 3,245,923 | 4/1966 | Manzella et al. ............ 260/45.75 N |
| 3,247,161 | 4/1966 | Cox ..................... 260/45.9 QB |
| 3,351,608 | 11/1967 | Oertel et al. ............ 260/45.9 QB X |
| 3,497,457 | 2/1970 | Hurlock et al. .......... 260/45.9 QB X |
| 3,637,573 | 1/1972 | Mise et al. ............. 260/45.9 QB X |
| 4,065,410 | 12/1977 | Schäfer et al. ............ 264/DIG. 83 |

OTHER PUBLICATIONS

"Materials and Compounding Ingredients for Rubber and Plastics", New York, Rubber World, 1965, pp. 152, 174, 175.

*Primary Examiner*—Philip Anderson
*Attorney, Agent, or Firm*—Oblon, Fisher, Spivak, McClelland & Maier

[57] ABSTRACT

Auto parts prepared from polyurethane are manufactured by a process comprising:
(a) preparing a polyol component by blending a stabilizer combination of (A) nickel dibutyldithio carbamate with (B) N-mono- or dimethylphenyl-N'-mono- or dimethylphenylphenylenediamine and/or (C) N,N'-diphenyl-p-phenylenediamine with a polyol and carbon black;
(b) reacting said polyol component with a polyisocyanate: and
(c) molding said reacted mass.

10 Claims, No Drawings

MANUFACTURING PROCESS FOR POLYURETHANE AUTO PARTS AND AUTO PARTS MANUFACTURED THEREBY

BACKGROUND OF THE INVENTION

1. Field of the Invention

The present invention relates to a process for manufacturing auto parts from polyurethane materials.

2. Description of the Prior Art

Recently the reaction-injection molding process has come into increasing use for the fabrication of auto parts such as bumpers, grills, soft fascias, steering wheels with foamed or non-foamed urethane. The reasons for this are that polyurethane fully meets the necessary requirements of auto parts that they be resistant to shock and chemicals. The reaction-injection molding process is suitable for molding objects of intricate configurations such as exist in various auto parts, because in this process, polyurethane can be blended under pressure and at the same time can be injected into a metal mold. Moreover, the molding cycle of polyurethane is extremely short and occurs with high molding efficiency.

Polyurethane, however, has certain well-known deficiencies which include the fact that it is not sufficiently weatherproof. For instance over a period of long service life, the exterior portions of auto parts made from polyurethane will be exposed to direct sunlight. Under these conditions not only will the surface of the part loose its gloss and crack, but the interior portions thereof will suffer physical deterioration. The addition of carbon black to the polyurethane articles will promote the effective absorption of ultraviolet rays and therefore is seemingly a logical solution to the problem of weathering. However, the problem with this approach is that the color of carbon black will fade with time. In an effort to improve the weathering problem of polyurethane auto parts various anti-aging agents for rubber have been proposed, but with no satisfactory results obtained for auto parts which are subjected to long service life. Therefore a need continues to exist for a method of improving the weathering resistance of polyurethane to improve its acceptability for use in the manufacture of atuo parts.

SUMMARY OF THE INVENTION

Accordingly, an object of the present invention is to provide molded auto parts from polyurethane which exhibit excellent anti-weather, anti-shock and anti-chemical properties, as well as a method for manufacturing said auto parts.

Another object of the present invention is to provide a process of manufacturing polyurethane molded products having good anti-weather properties by the reaction-injection method.

Still another object of the present invention is to provide polyurethane molded products having good anti-weather properties and which are manufactured by a technique which uses carbon black.

Briefly, these objects and other objects of the present invention as hereinafter will become more readily apparent can be attained by a method for manufacturing auto parts from polyurethane by a process comprising:

(a) preparing a polyol component by blending a stabilizer combination of (A) nickel dibutyldithio carbamate with (B) N-mono- or dimethylphenyl-N'-mono- or dimethylphenylphenylenediamine and-/or (C) N,N'-diphenyl-p-phenylenediamine with a polyol and carbon black;

(b) reacting said polyol component with a polyisocyanate; and (c) molding said reacted mass.

DETAILED DESCRIPTION OF THE PREFERRED EMBODIMENTS

The present invention is based upon the discovery that polyurethane auto parts possessing good anti-weather properties can be manufactured by the combined use of specific stabilizer compounds and carbon black in the formulation of the polyurethane composition.

The key feature of the present invention resides in the reaction-injection molding of a mixture composed of a polyol mixed with a stabilizer which can be a mixture of nickel dibutyl-dithio carbamate with N-mono or dimethylphenyl-N'-mono or dimethylphenylphenylenediamine and/or N,N'-diphenyl-p-phenylenediamine; carbon black; and a polyisocyanate.

The excellent anti-weather properties of the polyurethane auto parts of the present invention can only be attained by combined use of the above-mentioned stabilizer and carbon black. If either the stabilizer or carbon black component is lacking in the molded product, the above-mentioned excellent anti-weather effects will never be realized.

As stated above, nickeldibutyldithio carbamate may be combined singly with N-mono or dimethylphenyl-N'-mono or dimethylphenylphenylenediamine or with N,N'-diphenyl-p-phenylenediamine, or with a mixture of these two compounds. This mixture is commercially available under the name of "mixed diarylphenylenediamine."

A mixture of 10 weight parts of the mixed diarylphenylene-diamine and, usually 2 to 15 weight parts, preferably 5 to 10 weight parts, of nickeldibutyldithio carbamate will make an appropriate stabilizer combination. If less than 2 parts of the formulation are added, good anti-weather properties will not be assured. On the other hand, if more than 15 parts by weight are mixed in the composition, the desired anti-weathering effects will not be as great as might be expected.

In the preparation of material for the reaction-injection molding process, it is appropriate to combine from 0.2 to 2.0 weight parts of the stabilizer combination with 100 weight parts of polyol, i.e., a polyurethane material, the preferred amount being in the range of 0.5 to 1.5 parts by weight. The stabilizer combination is a solid state material at room temperature and the amount of it used relative to the polyol component is extremely small. Therefore, it is desirable to disperse the stabilizer in an adequate volume of polyol for better mixing efficiency. When the carbon black component is included in the composition with the stabilizer, it is preferred to disperse both the stabilizer and carbon black in an adequate volume of polyol in advance.

Since large volumes of polyol and polyisocyanate are to be blended for the reaction ultimately in the manufacture of the polyurethane auto parts, it is desirable for the sake of compatibility and reactivity that the adequate volume of polyol used, in which the stabilizer and carbon black are dispersed, be of a composition identical or similar to that of a large volume of polyol.

In the mixing of an adequate volume of polyol with carbon black and the stabilizer, machines such as three-roll mill or powerful kneaders can be employed for the kneading process.

The carbon black which is blended with the stabilizer may be derived from any suitable source such as the carbon black produced by the channel method or by the furnace method. However, carbon black produced by the channel method is preferred because it exhibits better effects in the present invention. A suitable volume of carbon black for blending with the other components of the composition would be an amount corresponding to 0.5 to 2.0 parts by weight carbon black per 100 parts by weight of polyol. If the amount of carbon black added is less than 0.5 part by weight, the ultraviolet light absorption effect of the resulting polyurethane composition will not be sufficient to achieve the desired anti-weathering properties. On the other hand, if the amount of carbon black is greater than 2.0 parts by weight, the effect will not be proportional to the added volume and the strength of the molded product will be insufficient.

Suitable polyol compounds for use as the polyol component in the manufacture of the polyurethane material of the present invention include polyester polyols and polyetherpolyols. Moreover, dihydric and polyhydric alcohols may also be included with the polyol as the polyol component. The polyesterpolyols include principally those with terminal hydroxyl groups which are obtained through condensation reactions between polyhydric alcohols such as ethyleneglycol, diethyleneglycol, propyleneglycol, trimethylolpropane, glycerine and polybasic acids such as oxalic acid, adipic acid, sebacic acid, maleic acid, fumaric acid, isophthalic acid, and terephthalic acid. The polyetherpolyols include those obtained through addition reactions between polyhydric alcohols such as glycerine, trimethylolpropane, pentaerythritol, sorbitol, and alkylene oxides such as ethylene oxide and propyleneoxide. Dihydric and polyhydric alcohols include such alcohols as, propyleneglycol and butylglycol. These polyols may, if necessary, be concocted in advance with such well-known additives used in polyurethane manufacture as foaming agents, foam adjusters and urethane reaction promoters.

Suitable polyisocyanate compounds for use in the preparation of the polyurethane product include those containing more than two free isocyanate radicals, for example, 1,4-tetramethylenediisocyanate, 1,6-hexamethylenediisocyanate, dicyclohexyl-4,4'-diisocyanate, toluylene-2,4-(or 2, 5 or 2, 6) diioscyanate, diphenyl-3,3'-(or 4,4') diisocyanate, diphenylmethane-4,4'-diisocyanate; polymers of these polyisocyanates; isocyanate adducts obtainable through addition reactions between said polyisocyanates and their polymers, and polyhydric alcohols such as ethyleneglycol, propyleneglycol, glycerine, trimethylolpropane, pentaerythritol, sorbitol; and polyurethane prepolymers obtainable through partial urethane reaction between said compounds containing free isocyanate radicals and the polyols.

These polyisocyanates may be employed singly or in admixture of two or more. It is appropriate to use the polyisocyanate in amounts greater than the stoichiometric volume, preferably in an amount less than a slight excess over the amount of polyol. Depending on the need, well-known foaming agents such as water, foam adjusters such as Freon and urethane reaction promotors such as triethylenediamine and dibutyltindilaurate may be added in adequate quantities.

For the purposes of the reaction-injection molding process the polyol composition which contains the above-mentioned stabilizer and carbon black, and the polyisocyanate should be separately stored in tanks, which are desirably equipped with a thermostat so that the materials stored can be held at constant temperature. It is desirable to maintain the mass of material to be molded at constant temperature which is not only in the tanks but also in the piping between the tanks and molding machine and the molding machine by circulating the material with pumps.

The polyol and the polyisocyanate can come into contact with each other only when they are separately charged under pressure into the mixing chamber of the molding machine. The pressure normally used is as high as about 100 to 200 kg/cm$^2$, and the two masses, separately injected, are instantly blended within the chamber. The two components thus mixed are then poured into the metal mold, wherein the urethane reaction completes itself. The metal mold may be initially heated to about 30°–80° C. to accelerate the polyurethane formation reaction; or if necessary, post-hardening of the polyurethane product may be done. In this manner the polyurethane auto parts of the present invention can be obtained.

Having generally described the invention, a further understanding can be obtained by reference to certain specific examples which are provided herein for purpose of illustration only and are not intended to be limiting unless otherwise specified.

EXAMPLE 1

Ten parts of channel carbon black were added to 80 parts of a polyether polyol having a molecular weight of 4900 which had been obtained by adding a mixture of ethylene-oxide and propyleneoxide to glycerine. After sufficient kneading in a three-roll mill, 9 parts of mixed diarylphenylenediamine and 5 parts of nickel dibutyldithio carbamate as stabilizer components were added, and the resultant material was fully kneaded. Eight parts of the kneaded mixture was mixed and well stirred with 100 parts of "Tral H-510" (a polyol compound of a polyether base produced by Dainihol Ink Chemical Industry). Next, 108 parts of this mixture was charged into the polyol tank of a reaction-injection molding machine (Elastogran Co. -promate molding machine), while 106 parts of "Tral F-610" (polyisocyanate produced by Dainihon Ink Chemical Industry) was charged into the polyisocyanate tank of this molding machine. Thus by injection into a metal mold at 60° C. with injection pressure 150 kg/cm$^2$, a semi-rigid foamed polyurethane product, 200 mm × 300 mm × 3 mm, with a foam density of 0.91 g/cm$^2$ was obtained.

EXAMPLE 2

Six parts of mixed diarylphenylenediamine and 4 parts of nickel-dibutyldithio carbamate were employed as stabilizer components. Otherwise the same conditions as described in Example 1 were employed to produce a molded product.

EXAMPLE 3

Instead of the mixed diarylphenylenediamine employed in Example 1, 5 parts of N-mono or dimethylphenyl-N'-mono or dimethylphenylphenylenediamine and 5 parts of nickel dibutyldithio carbamate were used in the formulation of the polyol component. Otherwise the same conditions as described in Example 1 were used to produce a molded product.

EXAMPLE 4

Instead of the mixed diarylphenylenediamine employed in Example 1, 5 parts of N,N'-diphenyl-p-phenylenediamine and 5 parts of nickeldibutyldithiocarbamate were used to prepare the polyol component. Otherwise the same conditions as described in Example 1 were adopted to produce a molded product.

CONTROL EXAMPLE 1

No stabilizer was employed in this procedure. Otherwise, the same technique described in Example 1 was used to obtain a molded product.

CONTROL EXAMPLE 2

Only 10 parts of mixed diarylphenylenediamine was used as a stabilizer. Otherwise, in the same way described in Example 1, a molded product was obtained.

CONTROL EXAMPLE 3

Only 10 parts of nickeldibutyldithiocarbamate was used as a stabilizer. Otherwise, in the same way described in Example 1, a molded product was obtained.

The molded products obtained from each of the examples were exposed to radiation for 200, 400 and 600 hours respectively in a Sunshine Weather-o-meter (black panel 63°±3° C.) and the products were examined with respect to their ability to resist light, heat and oxygen, the results being summarized in the Table.

| Example | Hours of radiation | | | |
|---|---|---|---|---|
| | 0 | 200 | 400 | 600 |
| 1 | Class 5 | Class 5 | Class 5-4 | Class 4 |
| 2 | " | " | " | " |
| 3 | " | " | Class 4 | " |
| 4 | " | " | " | " |
| Control 1 | " | Class 3 | Class 2 | Class 1 |
| 2 | " | Class 5-4 | Class 4—3 | Class 2 |
| 3 | " | Class 3 | Class 3-2 | Class 2-1 |

In the above table, anti-weather ability was rated in 5 classes by naked eye examination of each product for loss of gloss, cracking and fading of the product after radiation with reference to the state of the product before radiation.

Rating
  Class 5: Same as before radiation.
  Class 4: Little fading with ample gloss retained.
  Class 3: Appreciably faded with little gloss retained.
  Class 2: No cracks, but strongly faded with no gloss.
  Class 1: Substantial fading with no gloss and appreciably cracked.

As is evident from Table 1, the molded products of the present invention in Examples 1 to 4 exhibit excellent anti-weather properties even after 600 hours of radiation, in comparison to the products of Control Examples 1 to 3. The evidence testifies to how great is the combined effect of stabilizer and carbon black.

Having now fully described this invention, it will be apparent to one of ordinary skill in the art that many changes and modifications can be made thereto without departing from the spirit or scope of the invention as set forth herein.

What is claimed and intended to be secured by Letters Patent is:

1. A process for manufacturing polyurethane based auto parts by reaction-injection molding, comprising:
   (a) preparing a polyol component by blending a stabilizer combination of from 2–15 parts by weight of (A) nickel dibutyldithiocarbamate and 10 parts by weight of (B) N-mono or dimethylphenyl-N'-mono or dimethylphenyl phenylene diamine and/or (C) N,N'-diphenyl-P-phenylene diamine with a polyol and carbon black;
   (b) reacting said polyol component with a polyisocyanate; and
   (c) reaction-injection molding said reacted mass.

2. The process of claim 1, wherein the amount of component A ranges from 5–10 parts by weight.

3. The process of claim 1, wherein from 0.2–2.0 parts by weight of the stabilizer combination composed of components A and B and/or C is blended with 100 parts by weight of said polyol.

4. The process of claim 3, wherein the amount of said stabilizer combination ranges from 0.5–1.5 parts by weight.

5. The process of claim 1, wherein from 0.5–2.0 parts by weight of carbon black is blended with 100 parts by weight of said polyol.

6. The process of claim 1, wherein said polyol is a polyesterpolyol and/or a polyetherpolyol.

7. The process of claim 1, wherein a dihydric or polyhydric alcohol is combined with said polyol.

8. The process of claim 6, wherein said polyesterpolyol is the condensation product of ethyleneglycol, diethyleneglycol, propyleneglycol, trimethylolpropane or glycerine with oxalic acid, adipic acid, sebacic acid, maleic acid, fumaric acid, isophthalic acid or terephthalic acid.

9. The process of claim 6, wherein said polyetherpolyol is the addition reaction product between glycerine, trimethylolpropane, pentaerythritol or sorbitol and ethylene oxide or propylene oxide.

10. An auto part formulated from polyurethane prepared by the process of claim 1.

* * * * *